United States Patent [19]

Dennis et al.

[11] 4,255,165
[45] Mar. 10, 1981

[54] COMPOSITE COMPACT OF INTERLEAVED POLYCRYSTALLINE PARTICLES AND CEMENTED CARBIDE MASSES

[75] Inventors: Mahlon D. Dennis, Columbus; Paul D. Gigl, Worthington, both of Ohio

[73] Assignee: General Electric Company, Worthington, Ohio

[21] Appl. No.: 972,345

[22] Filed: Dec. 22, 1978

[51] Int. Cl.³ .............................................. B24D 3/06
[52] U.S. Cl. ...................................... 51/309; 51/295; 51/307
[58] Field of Search ................. 51/307, 309, 308, 295

[56] References Cited

U.S. PATENT DOCUMENTS

| | | | |
|---|---|---|---|
| 3,743,489 | 7/1973 | Wentorf et al. | 51/309 |
| 3,767,371 | 10/1973 | Wentorf et al. | 51/309 |
| 3,868,234 | 2/1975 | Fontanella | 51/309 |
| 3,944,398 | 3/1976 | Bell | 51/309 |
| 3,949,062 | 4/1976 | Vereschagin | 51/307 |
| 3,982,911 | 9/1976 | Lee | 51/309 |
| 4,063,909 | 12/1977 | Mitchell | 51/309 |
| 4,108,614 | 8/1978 | Mitchell | 51/309 |
| 4,110,084 | 8/1978 | Lee et al. | 51/309 |
| 4,156,329 | 5/1979 | Daniels | 51/309 |
| 4,167,399 | 9/1979 | Lee et al. | 51/307 |
| 4,171,973 | 10/1979 | Yazu et al. | 51/307 |

*Primary Examiner*—Donald J. Arnold
*Attorney, Agent, or Firm*—Douglas B. Little; W. S. Feiler; D. A. Dearing

[57] ABSTRACT

One or more masses of bonded particles of diamond, cubic boron nitride (CBN), and wurtzite boron nitride (WBN) are sandwiched between or encapsulated by two masses of cemented carbide bonded to the particle masses. In the preferred embodiment, the particle masses are comprised of (1) at least 70% by volume of said particles, and (2) a metallic phase comprised of the cementing agent of the carbide mass. The composite compacts find utility in drill bit, mining tool and wear part applications.

A method for making such a composite compact comprises (1) placing within a reaction cell masses of abrasive particles and at least two carbide masses interleaved with the abrasive particle masses, (2) the masses are placed in the cell in such a manner to allow for the accommodation of pressure and (3) simultaneously subjecting the cell and the contents thereof to temperature and pressure conditions at which the particles are stable.

A method for abrading or cutting a workpiece with a composite compact comprises providing (1) a tubular carbide mass and a bonded mass of abrasive particles disposed in and bonded to the carbide mass in a central cavity thereof and (2) moving either the compact or workpiece relative to the other to provide the cutting or abrading action.

4 Claims, 13 Drawing Figures

COMPOSITE COMPACT OF INTERLEAVED POLYCRYSTALLINE PARTICLES AND CEMENTED CARBIDE MASSES

CROSS REFERENCE TO RELATED APPLICATIONS

Commonly assigned, U.S. patent application Ser. No. 699,411 filed June 24, 1976, now U.S. Pat. No. 4,109,737 is directed to a rotary drill bit comprising a plurality of cutting elements comprised of an elongated pin with a diamond compact bonded to the exposed end of the pin.

Commonly assigned, U.S. patent application Ser. No. 746,044 filed Nov. 30, 1976, now U.S. Pat. No. 4,098,362 is directed to a rotary drill bit comprising a plurality of cutting elements comprising a diamond compact disposed at a negative rake angle. The compact is attached to the drill crown either by being directly embedded in the drill crown or by being attached to a tungsten carbide pin which is, in turn, fixed to the drill crown.

BACKGROUND OF THE INVENTION

This application relates to composite compacts of diamond, cubic boron nitride (CBN) or wurtzite boron nitride (WBN) or mixtures thereof for use as a shaping, extruding, cutting, abrading or abrasion resistant material and particularly as a cutting element for rock drilling.

A cluster compact is defined as a cluster of abrasive particles bonded together either (1) in a self-bonded relationship, (2) by means of a bonding medium disposed between the crystals, or (3) by means of some combination of (1) and (2). Reference can be made to U.S. Pat. Nos. 3,136,615; 3,233,988 and 3,609,818 for a detailed disclosure of certain types of compacts and methods for making same. (The disclosures of these patents are hereby incorporated by reference herein.)

A composite compact is defined as a cluster compact bonded to a substrate material such as cemented tungsten carbide. A bond to the substrate can be formed either during or subsequent to the formation of the cluster compact. It is, however, highly preferable to form the bond at high temperatures and high pressures in the stable region of P, T phase diagram of the abrasive particle and comparable to those at which the cluster compact is formed. Reference can be made to U.S. Pat. Nos. 3,743,489; 3,745,623 and 3,767,371 for a detailed disclosure of certain types of composite compacts and methods for making same. (The disclosures of these patents are hereby incorporated by reference herein.)

It has been recently proposed to use synthetic diamond compacts (both cluster and composite) as the cutting elements in rotary drill bits. Such compacts are preferably made in accordance with U.S. Pat. No. 3,745,623. The typical tool design has the abrasive table layer exposed.

One of the problems encountered in the use of the inventions disclosed and claimed in the two patents cross referenced above is that, while the bits provide aggressive cutting action and have abundant room for swarf removal between compact cutting elements, the stresses on each cutting element are severe and cause failures to occur. For example, the carbide pin on which a compact is fixed in certain embodiments may be broken. Also the compact itself is often fractured or cracked. The stresses are due to the fact that the structure of rocks encountered in rock drilling is heterogeneous and thus has layers of varying hardness. These layers cause large variation in the impact loads which are applied to the compact cutting elements during drilling.

Accordingly, it is a feature of this invention to provide an improved composite compact which has improved resistance to fracture for use as drill bits, mining tools, cutting tools and wear pads and improved methods for the manufacture of such compacts.

Another feature of the invention is to provide a composite compact for rock drilling applications which can be operated at faster penetration rates.

Another feature of the invention is to provide a composite compact with enhanced resistance to crack propagation.

Another feature of the invention is to provide an improved method for making a composite compact which has reduced diffusion distances for the transmission of a metallic phase from a cemented carbide mass into the particle mass. Further, this invention overcomes the problems encountered in the manufacture of composite compacts with multiple layers or encapsulation of the lack of adequate accommodation of various components during the HP/HT cycle, which resulted in poorly bonded compacts. This invention produces properly bonded compacts.

SUMMARY OF THE INVENTION

These and other features of the invention are accomplished by a composite compact comprising one or more masses of bonded particles of diamond, cubic boron nitride (CBN), or wurtzite boron nitride (WBN) and at least two masses of cemented carbide interleaved with or encapsulating and bonded to the particle masses. In a preferred embodiment, the particle mass is composed of a first phase of at least 70% by volume of said particles with the remainder being a second phase of a metallic material comprised of the cementing agent of the carbide mass.

Other features of this invention are provided by a method for making such a composite compact, which method comprises (1) placing within a reaction cell one or more masses of said abrasive particles and at least two carbide masses interleaved with the abrasive particle masses and (2) simultaneously subjecting the cell and the contents thereof to temperature and pressure conditions at which the particles are stable. In a preferred embodiment, at least a portion of said carbide masses are in granular or powder form in order to allow for accommodation of cell parts and improved bonding.

Still other features of this invention are provided by a method for abrading or cutting a workpiece with a composite compact which method comprises the steps of (1) providing a tubular carbide mass and a bonded mass of abrasive particles disposed in and bonded to the carbide mass in a central cavity thereof and (2) moving either the compact, workpiece or both relative to the other to provide the cutting or abrading action.

DETAILED DESCRIPTION OF PREFERRED EMBODIMENT

Figure 1A:
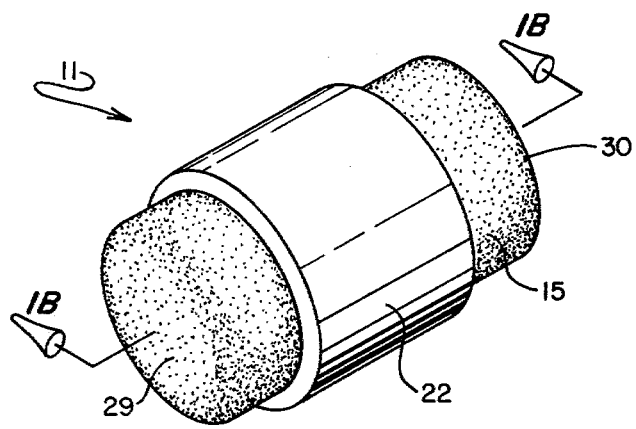
FIG. 1A is a perspective view of a composite compact in accordance with the features of this invention.

While this invention is susceptible of embodiment in many different forms there is shown in the drawings and will hereinafter be described in detail a preferred embodiment of the invention, and modifications thereto, with the understanding that the present disclosure is to be considered as an exemplification of the principles of the invention and is not intended to limit the invention to the embodiments illustrated.

THE COMPOSITE COMPACTS

Figure 1B:
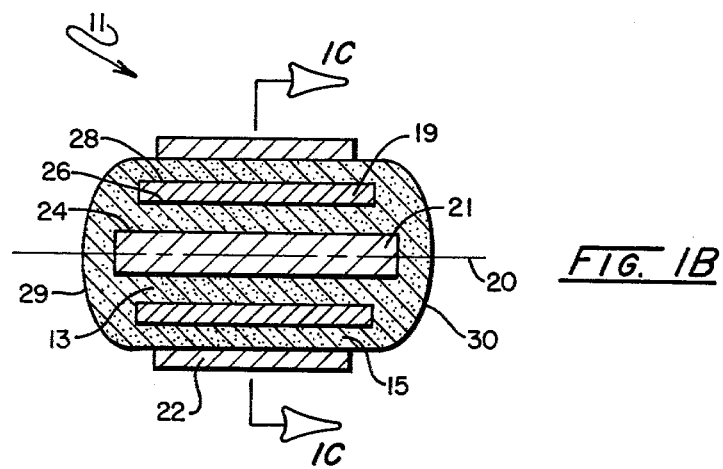
FIG. 1B is a longitudinal cross-sectional view of the compact of FIG. 1A taken along line 1B—1B.
Figure 1C:
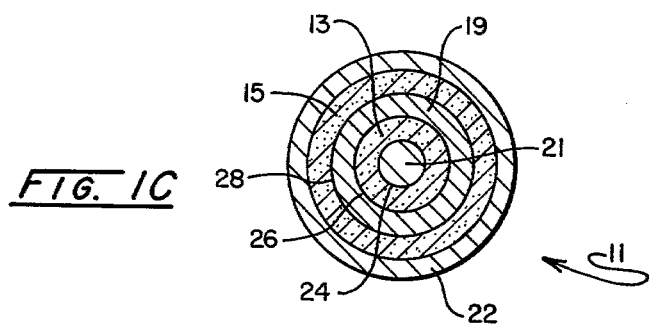
FIG. 1C is a transverse cross-sectional view of the compact of FIG. 1A taken along line 1C—1C.

FIGS. 1A–1C, show composite compact 11 in accordance with the features of this invention. Compact 11 has particular utility as a cutting element in drill bits, mining tools and as wear pads. Compact 11 includes at least two masses of bonded particles selected from the group consisting of diamond, CBN and WBN, or mixtures thereof and at least two masses of cemented carbide encapsulating or interleaved with and bonded to said particle masses.

In the embodiment shown in FIGS. 1A–1C, the compact 11 is shown with two masses 13, 15 of bonded particles, two masses 19,21 of cemented carbide, and a metal sleeve 22 surrounding mass 15. Carbide mass 21 is rod-shaped and is disposed generally along the central longitudinal axis 20 of compact 11. Particle mass 13 has a tubular configuration, is disposed generally coaxially of axis 20 and is bonded to rod-shaped carbide mass 21 along a first interface 24. Carbide mass 19 is tubular, is disposed generally coaxially of said axis 20 and is bonded to particle mass 13 along a second interface 26. The second particle mass 15 is disposed generally coaxially of axis 20 and is bonded to tubular carbide mass 19 along a third interface 28. Outer surfaces 29, 30 for engagement with a workpiece are formed at each end of compact 11.

In applications, such as a cutting element for a rock drill, compact 11 would be mounted with its longitudinal axis substantially parallel with a radius of the drill crown. In this orientation only one of surfaces 29, 30 would be engageable with a workpiece (strata). Also, if desired and as shown in FIG. 1B particle masses 13, 15 may extend beyond and over the ends of carbide masses 19, 21 thereby forming at each end of compact 11 a continuous particulate surface at which carbide masses 19, 21 and particle masses 13, 15 would be alternately exposed only after the continuous surface has been worn away during use. Also, during use, masses 19, 21 wear at a faster rate than masses 13, 15 (masses 13, 15 having a higher abrasion resistance than carbide masses 19, 21) leaving masses 13, 15 to project above and to form spaced claw-like cutting fingers. The formation of such fingers provides an effective cutting action superior to that achieved in accordance with prior art constructions.

Metal sleeve 22 is preferably of high-strength steel and preferably interference fitted and brazed at high temperature. This arrangement places compact 11 in compression and results in the further strengthening and prevention of crack propagation in the compact. Additionally, sleeve 22 provides an exterior surface which is easily attachable by conventional techniques in a tool body or holder.

While it is preferred that a carbide mass (21 of FIG. 1C) be positioned centrally in compact 11 surrounded by alternating layers of particle masses and carbide masses, a particle mass may be positioned along the longitudinal axis of compact 11 surrounded by alternating interleaved or encapsulating masses of carbide and abrasive particles.

Figure 2A:
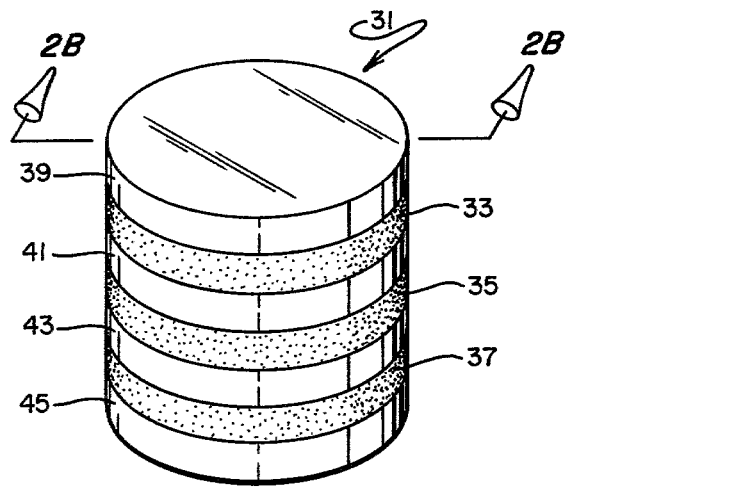
FIG. 2A is a perspective view of a second embodiment of a composite compact in accordance with the features of this invention.
Figure 2B:
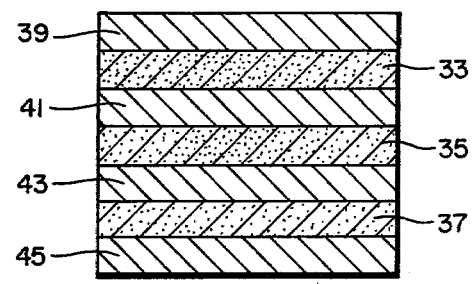
FIG. 2B is a cross-sectional view of the compact of FIG. 2A taken along line 2B—2B.

Composite compacts in accordance with this invention may be of a generally cylindrical structure of longitudinally disposed interleaved masses or may alternatively be a cylindrical structure of masses disposed transverse to the longitudinal axis of the cylinder in accordance with a second embodiment of the invention shown in FIGS. 2A and 2B. This second embodiment has particular utility as a cutting element in drill bits, mining tools and as wear pads in stabilizing tools.

In FIGS. 2A, 2B, a composite compact 31 includes a plurality of planar masses 33, 35, 37 of bonded particles selected from the group consisting of diamond, CBN and WBN and mixtures thereof and a plurality of planar masses 39, 41, 43, 45 of cemented carbide interleaved with and bonded to particle masses 33, 35, 37 at each interface of the particle masses with carbide masses.

The outer peripheral surface of compact 31 is formed perpendicular to the planar particle and carbide masses for engagement with a workpiece. Also, as in the case of the embodiment shown in FIGS. 1A–1C the outer surface may be provided with a continuous particulate surface.

Similarly, as explained in the case of the embodiment of FIG. 1, during use particle masses 33, 35, 37 form spaced claw-like cutting fingers to provide an effective cutting action.

Compact 31 may be cut and shaped into a variety of geometrical configurations. However, an arcuate cutting or abrading edge (e.g., FIG. 1 herein) is preferred over one with a linear edge because it requires less force to penetrate the workpiece surface and also generates less heat. The generation of heat can result in degradation of the particle mass and interface bonding.

Figure 3A:
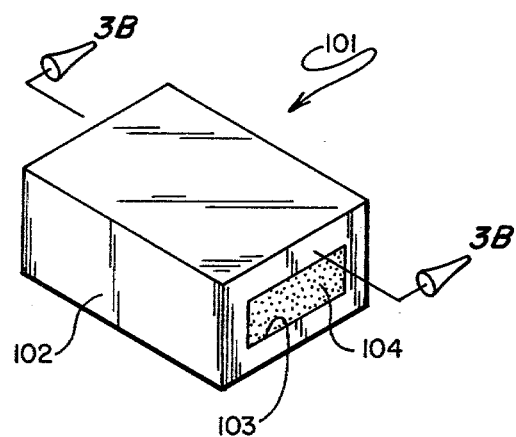
FIG. 3A is a perspective view of an embodiment of a composite compact for use in the practice of a method for abrading or cutting a workpiece with a composite compact in accordance with this invention.
Figure 3B:
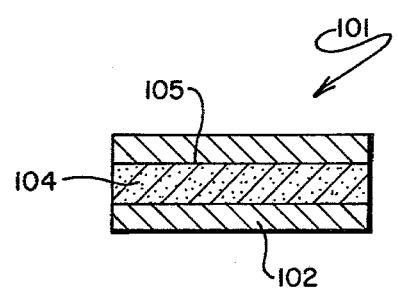
FIG. 3B is a cross-sectional view of the compact of FIG. 3A taken along line 3B—3B.

FIGS. 3A and 3B show a composite compact 101 in the form of a rectangular parallelopiped. Compact 101 comprises an encapsulating tubular cemented carbide mass 102 with a central cavity 103 therein and a bonded mass of abrasive particles (diamond, CBN or WBN or mixtures) disposed in cavity 103 and bonded to carbide mass 102 along an interface 105. The sandwich arrangement (FIG. 3B) of abrasive 104 and two layers of sintered carbide 102 is particularly useful since one carbide layer acts as a substrate while the other acts as a chip breaker.

Figure 4A:
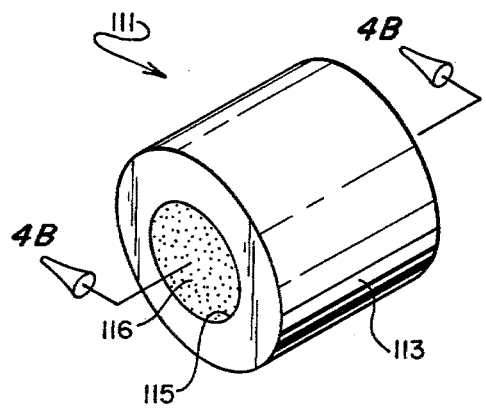
FIG. 4A is a perspective view of a further embodiment of a composite compact for use in the practice of a method for abrading or cutting a workpiece with a composite compact in accordance with this invention.
Figure 4B:
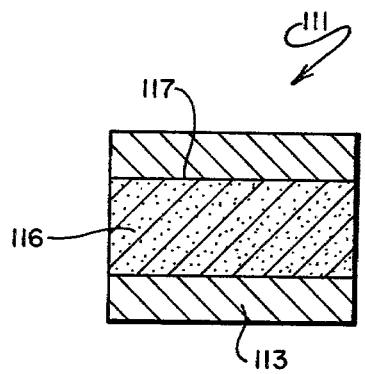
FIG. 4B is a cross-sectional view of the compact of FIG. 4A taken along line 4B—4B.

FIGS. 4A and 4B show a composite compact 111 of a cylindrical configuration which includes an encapsulating tubular carbide mass 113 with a centrally disposed cavity 115 and a bonded mass 116 of abrasive particles (diamond, CBN or WBN or mixtures) disposed in cavity 115 and bonded to carbide mass 113 along an interface 117. As will be apparent to those skilled in the art, other geometrical configurations may be used in the practice of this method.

THE COMPACT MACHINING METHOD

This invention also encompasses a new method for the machining of a workpiece, such as metal, rock, ceramics, and metal-bonded carbides. In brief, the method comprises the steps of (a) providing a composite compact of the type shown in FIGS. 1-4,6,7 and (b) engaging the compact and the workpiece and (c) moving either one of said compact or said workpiece relative to the other to provide a cutting or an abrading action.

In the practice of step (b) of this method, such composite compacts may be fixed in conventional machines for cutting and abrading a workpiece, such as a lathe for machining metals and non-metals or a drill bit for cutting, and abrading a workpiece of rock or similar material. This is accomplished by mounting the compact on a tool holder by brazing or other conventional bonding techniques. The compact tool is then placed in a machine; and the tool and the work surface are engaged in a conventional manner consistent with the well-known operation of such machines.

In the practice of step (c) to provide the cutting or abrading action, one of said compact and workpiece is moved relative to the other. The relative motion may be accomplished in any conventional manner consistent with the operation of such machines and would include functionally, while the tool and workpiece are in engagement, (1) moving the compact tool relative to a fixed workpiece, (2) moving the workpiece relative to a fixed tool, or (3) moving both the compact tool and workpiece.

METHOD OF FABRICATION COMPOSITES

In the fabrication of compacts as shown in FIGS. 1-4 the bonds along the interfaces between the particle masses and carbide masses are formed under high pressures/high temperatures. Preferably, these bonds are free of voids, irregular and interlocked on a scale of about 1-100 micrometers. The interlocking primarily occurs between adjacent particles in the particulate masses. Also, it is developed because the single particles of the abrasive in the particulate mass are etched on a microscopic scale which creates etched regions which are filled with cemented carbide from the carbide masses. Further, the cementing phase of the carbide, e.g. cobalt, and the metallic phase in the particle mass are continuous in and across the carbide mass and particle mass. This continuous metallic phase also bonds the two masses together.

One preferred form of a high pressure/high temperature (HP/HT) apparatus in which composite compacts as shown in FIGS. 1-4 may be prepared is disclosed in U.S. Pat. No. 2,941,248—Hall (incorporated hereby by reference herein). A preferred reaction cell for the practice of this invention is described in U.S. Pat. No. 3,609,818—Wentorf (incorporated hereby by reference herein).

Operational techniques for applying HP/HT conditions in this apparatus to such reaction cells are well known to those skilled in the super pressure art and are not repeated herein. As will be recognized, there are other apparatus capable of providing the HP/HT that are required to practice this invention.

Figure 5:
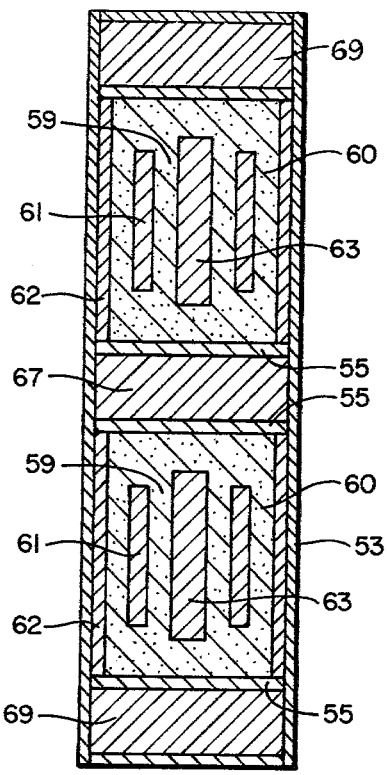
FIG. 5 is a longitudinal cross-sectional view of a reaction cell for making a composite compact in accordance with this invention and here shown loaded to produce the composite compact of FIG. 1.

In accordance with the features of this invention, FIG. 5 illustrates a reaction cell or charge assembly 51 for producing a composite compact of the types shown in FIGS. 1-4 and is here shown loaded to produce the embodiment of FIG. 1.

In the practice of the method of the invention for making composite compacts of FIGS. 1 and 2, at least two masses of abrasive particles 59, 60 are selected from the group of diamond, CBN and WBN or mixtures; interleaved with at least two carbide masses 61, 63 selected from the group consisting of sinterable carbide molding powder, green carbide bodies and cemented carbide; and positioned in metal sleeve 62. Carbide mass 63 is cylindrically shaped and is placed along the central axis of cell 51. The second carbide mass 61 is tubular and is placed coaxially of the mass 63. The spaces between masses 61 and 63 and between mass 61 and sleeve 62 are filled by the interposition of particle masses 59, 60 in powder or particulate form. After formation of the composite compact, the exterior metal sleeve 62 is ground away, if desired, to expose particle mass 60 and thereby to derive a compact of the configuration shown in FIG. 1 but without sleeve 22. Sleeve 22 is fabricated as described above.

The characteristics of and process for making the embodiment of FIG. 2 are identical to that shown in FIG. 4 and described below except that planar masses 33, 35, 37, 39, 41, 43 and 45 are preferably disposed in layers transverse of a cylindrical reaction cell of the type shown in FIG. 5. After application of HP/HT to the cell and its contents, the compact which is produced is a cylinder and may be machined by conventional techniques to a variety of shapes, such as a rectangular parallelepiped or other configuration.

Cell 51, although not illustrated in proportion, fits within a HP/HT apparatus (not shown) as described in U.S. Pat. No. 3,745,623; col. 3; lines 5-67 (incorporated by reference). Cell 51 comprises a cylindrical sleeve 53 of shield metal. Within sleeve 53 are disposed a number of sub-assemblies protected above and below by metal shielding discs 55. Each sub-assembly so protected on all sides consists of abrasive particle masses 59, 60 and carbide masses 61, 63 and sleeve 62. Positioned externally to discs 55 and separating each sub-assembly are disc-shaped masses 67, 69 of salt or talc. The function and composition of these masses 67, 69 is described in detail in U.S. Pat. No. 3,745,623; col. 4; lines 54-58. Each mass 59 prior to application of HP/HT is largely or completely made up of earlier diamond powder in a size range from about 0.1 um. to 500 um. in largest dimension (a mixture of diamond and minor quantity of graphite and/or carbide-making powder may be used), CBN or WBN in the same size range. The preferred diamond or CBN or WBN content in the unbonded masses 59, 60 is 85 to 99+% by weight of the constituents of masses 59, 60. However, a somewhat lower content of abrasive grit may be employed the lowest content being about 70% by volume after being reacted at HP/HT.

In making compacts the particle masses either may be preformed as a cluster compact prior to bonding to the carbide masses or may be formed in situ during the formation of the composite compact by the application of HP/HT, as described above.

Cemented carbide masses 61 and 63 are made by conventional pill pressing and sintering techniques from preferably a tungsten carbide molding powder (mixture of carbide powder and cementing agent of cobalt powder) commercially available in grit sizes of from 1 to 500 microns. Other sizes may also be used. The tungsten carbide may, if desired, be replaced in whole or in part by one or more of the materials: titanium carbide, tantalum carbide, chromium carbide and other refractory carbides, nitrides or borides. The cementing material may be selected from the group consisting of Co, Ni, Fe and mixtures thereof. More details of acceptable material compositions are set forth in U.S. Pat. No. 3,745,623 col. 5, line 58 to col. 6, line 8. Alternatively, as described in U.S. Pat. No. 3,745,623, col. 8, lines 57-66, presintered carbide masses may be used rather than carbide molding powder.

If desired, when masses 59, 60 are diamond, a thin sheet of catalytic material may be disposed between masses 59, 60 and the masses 61 and 63 adjacent thereto to supplement the catalytic-solvent action of the cementing material of the cemented carbide body. Acceptable catalytic materials are single catalytic metals selected from the group consisting of group VIII metals, Cr, Ta and Mn; a mixture of alloyable metals of the catalytic metal(s) and non-catalytic metal(s); an alloy of two or more of the catalytic metals; and an alloy of the catalytic metal(s) and non-catalytic metal(s). These catalytic materials are disclosed in more detail in U.S. Pat. No. 2,947,609—Strong and U.S. Pat. No. 2,947,610—Hall et al., both of which are hereby incorporated by reference. However, it has been found that the additional catalyst metal is not required and ordinarily not preferred.

When masses 59, 60 are CBN or WBN, if desired, either an aluminum alloy or aluminum and alloying material (selected from the group consisting of Ni, Co, Mn, Fe, V and Cr) may be disposed between or within masses 59, 60 and masses 61 and 63, adjacent thereto. A detailed description of such materials and their use is disclosed in U.S. Pat. No. 3,743,489, col. 3, lines 6-58.

In the preparation of composite compacts by this process, cell 51 is placed in a HP/HT apparatus. Cell 51 and its contents are then simultaneously subjected to HP/HT. The temperatures employed are in the range from about 1200° to 2000° K. for periods of time in excess of about three minutes and at the same time the system is subjected to very high pressures of 40 kbars, or higher. At the temperatures employed, of course, the cementing material or cobalt component, assuming masses 61 and 63 are cobalt cemented tungsten carbide, as is preferred, is melted making some of it available for diffusion from mass 61 and 63 into mass 59, 60. The interleaving of the carbide masses with the particle masses aids in ensuring adequate infiltration of the cobalt into masses 59, 60.

As is disclosed in U.S. Pat. No. 3,745,623, col. 5, lines 3-32, when masses 59, 60 are diamond, the cobalt functions as a catalyst/solvent for diamond growth and at the same time the diamond crystals in masses 59, 60 become consolidated into a mass of sintered diamond and the diamond masses 50, 60 and the carbide masses 61 and 63 are tightly bonded by an interface material comprised of a cobalt-rich region at the interface and the interlocking of particles of the masses. The residue of the catalyst/solvent material remains in the self-bonded diamond masses 59, 60 as a metallic phase between about 5% and 30% by volume of the masses 59, 60.

In the composite compacts of CBN or WBN made in accordance with both U.S. Pat. Nos. 3,743,489 and 3,767,371, the CBN or WBN masses 61 and 63 are self-bonded and a strong interface bond is formed between masses 59, 60 and carbide masses 61 and 63. In U.S. Pat. No. 3,767,371 the cobalt is mechanically entrapped in the selfbonded CBN mass (CBN being inert in cobalt) and a cobalt-rich region (interface material) is formed at the interface of masses 59, 60 with masses 61 and 63, respectively, and the interlocking of particles of the masses. In U.S. Pat. No. 3,743,489; col. 3, lines 31-36, when using the aluminum alloy process, the cobalt alloys with the molten aluminum alloy and forms an interface material to tightly bond the masses 59, 60 to masses 61 and 63. A residue of the alloy of cobalt/aluminum alloy remains in the self-bonded CBN masses 59, 60 as a metallic phase between about 5% and 30% by volume of the masses 59, 60.

A particularly preferred method of fabricating a composite compact, as shown in FIG. 2, wherein the bonded abrasive is sandwiched between or encapsulated by substrate layer of cemented carbide has also been discovered. This method involves the selected control of abrasive flow and accommodation at the high pressure/high temperature conditions required for proper pressure transmission and sintering of the abrasive-carbide layers.

When fully sintered carbide discs are used to sandwich a layer of abrasive powder, problems sometimes arise. The abrasive must flow and compact in a regular or uniform way in order to form the highest diamond density and uniform distribution of pressure. If the abrasive clumps together and forms a bridge between the carbide discs of the sandwich, poor diamond to diamond contact may occur, pressure distribution is non-uniform and poor sintering may take place. Delamination of the layer may occur in these situations.

When the carbide is introduced as a powder and the abrasive is given proper accommodation, these problems are overcome. The powder can conform to the slight irregularities in the abrasive and create a more uniform pressure distribution. The carbide sinters at HP/HT along with the abrasive to form an intergral composite sample.

A particularly preferred method of fabrication consists of placing the abrasive layer, e.g. diamond layer, in a carbide powder mold which surrounds the diamond layer. The carbide powder can shape itself to the diamond powder which may be contained in a metallic container, if necessary, and transmit the pressure to the diamond. The Co phase can sweep through at HP/HT conditions. The diamond powder must have more than one direction of flow or applied pressure. In other words, a fully sintered carbide disc may be used in the system if there is carbide powder on top of the diamond layer and the edges are exposed to a flexible medium, such as a metal container with a salt support bushing. In contrast, a blind hole in a carbide disc with carbide powder above would not be acceptable and would not allow the proper flow, compaction and sintering of the diamond.

Figure 6:
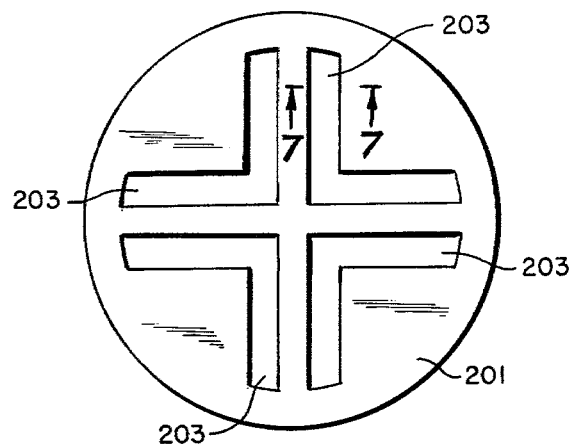
FIG. 6 is a top plan view of a fully sintered carbide element useful in fabricating composite compacts of encapsulated abrasive.
Figure 7:
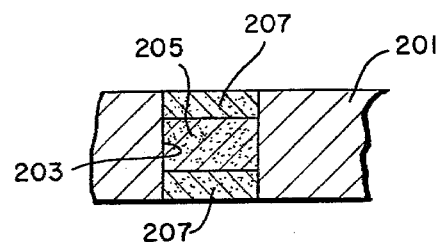
FIG. 7 is a fragmentary cross-section view of the fully sintered element of FIG. 6 when loaded with powder abrasive and carbide, taken generally along line 7—7 in FIG. 6.

A complex shape with barriers may be fabricated by placing a fully sintered, carbide, perforated shape such that powdered carbide can be placed above and below the diamond powder in the perforations. FIG. 6 shows a fully sintered, carbide element 201 with a set of four generlly L-shaped openings 203 for receipt of the abrasive and powdered carbide. FIG. 7 is a cross-sectional view of one of the L-shaped openings, charged with abrasive 205, e.g. diamond powder, and powdered carbide 207, e.g. cobalt cemented tungsten carbide. Abrasive 205 is disposed between walls of sintered carbide element 201 and sandwiched between two layers of powder carbide 207. This reactor cell can then be sintered at HP/HT conditions. The product will be encapsulated in carbide which can be segmented along the carbide barriers. A series of concentric cylinders of carbide-diamond could also be made in this fashion.

Figure 8:
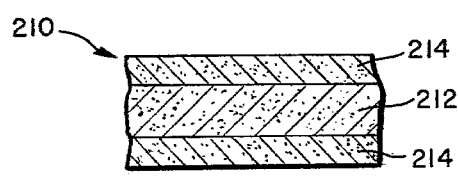
FIG. 8 is a cross-sectional view of another reactor cell showing a layer of abrasive particles between layers of powder carbide.

FIG. 8 shows another reactor cell 210 wherein a layer of abrasive 212 is disposed between two layers 214 of powder carbide to provide flow accommodation.

Reactor cells of the type shown in FIGS. 7 and 8 exbibit good pressure distribution and abrasive flow under HT/HP. Composite compacts of these configurations show good integrity of the resultant diamond layer and freedom from flaws and cracks.

Another possible addition to increase the flow characteristics of the diamond powder would be the addition of graphite powder to the diamond. The graphite would act as a lubricant during compaction, and be converted to diamond upon HP/HT sintering. Therefore, little if any loss in diamond density would occur in the product.

The composite compact design of this invention places a layer of carbide on the table surface in order to act as a chip breaker and also reduces the amount of diamond grinding by eliminating the large exposed diamond surface. This method could also be used to fabricate more complex abrasive-carbide structures such as a checkerboard surface for control of chip formation; discrete abrasive zones within the carbide substrate for drilling operations or ease of segmenting.

In accordance with the features of this invention, a number of other advantages are realized by such composite compacts. First, combining the abrasion resistance and hardness of the particle masses of diamond, CBN or WBN and the tensile strength or fracture toughness of the cemented carbide masses in a unitary body, a composite compact is produced which has the superior features of both components (i.e., toughness and abrasion resistance).

Secondly, the carbide masses may provide internal reinforcement of the composite compact against massive fracture by enhancing resistance to crack propagation throughout the compact. This aids in overcoming the prior art tendency of the particle mass to fracture in a plane parallel to the carbide interface surface during formation or use of the compact in severe stress applications. The use of at least two carbide masses aids in the prevention and in the containing such fractures within the particle mass.

Thirdly, the interleaving of the carbide masses with the particle masses ensures (1) adequate and complete infiltration of the carbide cementing agent throughout the particle mass thereby enhancing self-bonding of the diamond particle mass or of the CBN or WBN particulate mass when using the aluminum alloy process and (2) bonding of the particulate masses to the carbide masses.

Still another advantage of composite compacts and the method for the fabrication thereof is that by the formation at HP/HT, the carbide mass is bonded to the particle mass in a thermally expanded state. Cobalt cemented tungsten carbide (the preferred type of carbide) has a higher coefficient of volumetric expansion than diamond and CBN. Thus, when the compact is being reduced to room temperature, the carbide masses contracts more than the particle masses and thereby places the particle masses in a state of compression. Compacts (i.e., such as shown in FIGS. 1, 3, 4 and 7) are in a state of substantially radial compression relative to the longitudinal axis thereof.

Compacts as shown in FIGS. 2 and 8 are in a state of substantially radial compression along the interface between the particle and carbide mass (i.e., the compressional force vector lies substantially parallel to the plane of the interface). The compressional forces result in a substantial increase of the resistance of the compact to fracture and particularly the avoidance of a massive fracture of the compact due to the enhanced resistance of the interface to fracture propagation.

The method for fabricating compacts as shown in FIGS. 3, 4, 7 and 8 is the same as that described in connection with FIGS. 1 and 2, except for the arrangement and number of particle and carbide masses.

These and other modifications may be made by those skilled in the art without departing from the scope and spirit of the present invention, as pointed out in the appended claims.

What is claimed is:

1. In a composite compact which is comprised of:
   (a) a layer of polycrystalline material comprising abrasive particles selected from diamond, cubic boron nitride, wurtzite boron nitride, and mixtures thereof, bonded together in a self-bonded relationship; and
   (b) A cemented carbide mass bonded to one surface of the polycrystalline layer; the improvement which comprises a compact having at least two cemented carbide masses bonded to and interleaved with at least two masses of the polycrystalline material.

2. The improved composite compact of claim 1 which comprises:
   (a) At least two coaxial cylindrical masses of polycrystalline material,
   (b) a rod-shaped cemented carbide mass coaxial with and bonded to the smallest diameter mass of polycrystalline material, and
   (c) at least one tubular cemented carbide mass interleaved with and bonded to the tubular masses of polycrystalline material.

3. The improved composite compact of claim 2 which further comprises a metal sleeve surrounding the entire composite compact and joined thereto by interference fit and brazing.

4. The improved composite compact of claim 3 wherein the tubular metal metal sleeve is made of steel.

* * * * *